United States Patent
Schneider et al.

(10) Patent No.: US 11,174,669 B2
(45) Date of Patent: Nov. 16, 2021

(54) ASYMMETRICAL VACUUM-INSULATED GAZING UNIT

(71) Applicants: AGC GLASS EUROPE, Louvain-la-Neuve (BE); AGC INC., Tokyo (JP); AGC FLAT GLASS NORTH AMERICA INC., Alpharetta, GA (US); AGC VIDROS DO BRASIL LTDA, Sao Paulo (BR)

(72) Inventors: Pierre Schneider, Saint Christophe sur le Nais (FR); Abderrazek Ben Trad, Woluwe Saint-Lambert (BE); Julien Jeanfils, Corbais (BE)

(73) Assignees: AGC GLASS EUROPE, Louvain-la-Neuve (BE); AGC INC., Tokyo (JP); AGC FLAT GLASS NORTH AMERICA INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 0 days.

(21) Appl. No.: 16/963,536

(22) PCT Filed: Jan. 23, 2019

(86) PCT No.: PCT/EP2019/051573
§ 371 (c)(1),
(2) Date: Jul. 21, 2020

(87) PCT Pub. No.: WO2019/145332
PCT Pub. Date: Aug. 1, 2019

(65) Prior Publication Data
US 2021/0047878 A1 Feb. 18, 2021

(30) Foreign Application Priority Data
Jan. 23, 2018 (EP) .................................... 18152945

(51) Int. Cl.
*E06B 3/66* (2006.01)
*E06B 3/663* (2006.01)
*E06B 3/67* (2006.01)

(52) U.S. Cl.
CPC .......... *E06B 3/6617* (2013.01); *E06B 3/6612* (2013.01); *E06B 3/66304* (2013.01); *E06B 3/66342* (2013.01); *E06B 3/6715* (2013.01)

(58) Field of Classification Search
CPC ... E06B 3/6612; E06B 3/66304; Y02B 80/22; Y02A 30/249; B32B 17/10055; Y10T 428/2495; Y10T 428/24967
See application file for complete search history.

(56) References Cited

U.S. PATENT DOCUMENTS 2,966,435 A * 12/1960 Kassinger ........... E06B 3/67343
264/157
4,047,351 A * 9/1977 Derner .............. B32B 17/10045
52/786.13
(Continued)

FOREIGN PATENT DOCUMENTS

EP     1 010 679 A1    6/2000
JP    2001-316137 A   11/2001
(Continued)

OTHER PUBLICATIONS

English translation of applicant cited JP 2001-316137 (Year: 2001).*
(Continued)

*Primary Examiner* — Donald J Loney
(74) *Attorney, Agent, or Firm* — Oblon, McClelland, Maier & Neustadt, L.L.P.

(57) ABSTRACT

A vacuum insulating glazing unit includes a first glass pane having a thickness Z1, and a second glass pane made of prestressed glass having a thickness, Z2, where Z1 is greater than Z2 (Z1>Z2) The glazing unit also includes a set of discrete spacers positioned between the first and second (Continued)

glass panes and a hermetically bonding seal sealing the distance between the first and second glass panes over a perimeter. A vacuum of pressure less than 0.1 mbar is created in an internal volume V. A thickness ratio, $Z1/Z2$, of the thickness of the first glass pane, $Z1$, to the thickness of the second glass pane, $Z2$, is equal to or greater than 1.30 ($Z1/Z2 \geq 1.30$).

21 Claims, 3 Drawing Sheets

(56) References Cited

U.S. PATENT DOCUMENTS

| 5,891,536 | A | * | 4/1999 | Collins | B32B 37/0076 |
|---|---|---|---|---|---|
| | | | | | 428/34 |
| 6,309,733 | B1 | | 10/2001 | Minaai et al. | |
| 2013/0074918 | A1 | * | 3/2013 | Jeong | C03C 27/06 |
| | | | | | 136/256 |

FOREIGN PATENT DOCUMENTS

| JP | 2001-316138 A | 11/2001 |
|---|---|---|
| WO | WO 2013/008724 A1 | 1/2013 |

OTHER PUBLICATIONS

English translation of applicant cited WO 2013/008724 (Year: 2013).*

International Search Report dated Feb. 15, 2019 in PCT/EP2019/051573 filed Jan. 23, 2019.

* cited by examiner

σΔTmax = -3,1896 Z1/Z2 + 10.572
R² = 0.9402

σP = 0,11 (λ²/Z2²)
Z1 = 7 mm

ASYMMETRICAL VACUUM-INSULATED GAZING UNIT

FIELD OF THE INVENTION

The invention relates to a vacuum-insulated glazing wherein the glass panes are of different thicknesses and wherein one of the glass pane is a prestressed glass pane.

BACKGROUND OF THE INVENTION

Vacuum-insulated glazing are recommended because of their high-performance thermal insulation. Vacuum-insulated glazing is typically composed of at least two glass panes separated by an internal space in which a vacuum has been generated. In general, in order to achieve a high-performance thermal insulation (Thermal transmittance, U, being U<1.2 W/m$^2$K) the pressure inside the glazing unit is typically 0.1 mbar or less and generally at least one of the two glass panes is covered with a low-E layer. To obtain such a pressure inside the glazing unit, a hermetically bonding seal is placed on the periphery of the two glass panes and the vacuum is generated inside the glazing unit by virtue of a pump. To prevent the glazing unit from caving in under atmospheric pressure (due to the pressure difference between the interior and exterior of the glazing unit), spacers are placed regularly, for example in the form of a grid, between the two glass panes.

A technical problem to be addressed in vacuum-insulated glazing is the resistance to thermal stress induced by a temperature difference between exterior and interior environments. Indeed, the glass pane facing the interior environment, takes up a temperature similar to the temperature of the interior environment and the glass pane facing the exterior environment, takes up a temperature similar to the temperature of the exterior environment. In most stringent weather conditions, the difference between the interior and exterior temperatures can reach up to 30° C. and more. The temperature difference between the interior and exterior environments might cause an induced thermal stress inside the glass panes. In some severe cases, for instance, when the temperature difference is 20° C., the induced thermal stress might lead to breakage of the vacuum-insulated glazing. To resist this induced thermal stress, different solutions have been provided in the art such as increasing the thickness of both glass planes. Another solution is proposed in JP2001316137 which addresses how to improve vacuum-insulated glazing so that no deformation or distortion occurs even if the glass panes are hit by strong sunlight. JP2001316137 teaches to design a glazing wherein the inner glass plane disposed on the indoor side is thicker than the outer glass plane. In contrast, JP2001316138 teaches the opposite VIG construction wherein the outer glass plane disposed on the outdoor side is thicker than the inner glass plane, for improved chock resistance and acoustic.

However, none of the art addresses the technical problem of improving the resistance to induced thermal stress in vacuum-insulated glazing wherein glass panes are subjected to temperature difference between exterior and interior environments.

SUMMARY OF THE INVENTION

The present invention relates to a vacuum insulating glazing unit extending along a plane, P, defined by a longitudinal axis, X, and a vertical axis, Z, comprising:

a. a first glass pane having a thickness Z1, and a second glass pane having a thickness, Z2, wherein the thicknesses are measured in the direction normal to the plane, P, and wherein Z1 is greater than Z2 (Z1>Z2);

b. a set of discrete spacers positioned between the first and second glass panes and maintaining a distance between the first and the second glass panes;

c. a hermetically bonding seal sealing the distance between the first and second glass panes over a perimeter thereof;

d. an internal volume defined by the first and second glass panes and the set of discrete spacers and closed by the hermetically bonding seal and wherein a vacuum of pressure less than 0.1 mbar is created, characterized in that, a thickness ratio, Z1/Z2, of the thickness of the first glass pane, Z1, to the thickness of the second glass pane, Z2, is equal to or greater than 1.30 (Z1/Z2≥1.30), and in that the second glass pane is made of prestressed glass.

The present invention further relates to a partition separating a first space with a first temperature, Temp1, from a second space with a second temperature, Temp2, wherein Temp1 is lower than Temp2; the partition comprising an opening being closed by said vacuum insulating glazing unit. The present invention also relates to the use of said vacuum insulated glazing unit to close said opening of a partition.

DETAILED DESCRIPTION OF THE INVENTION

It is an object of the present invention to provide a vacuum-insulated glazing (hereinafter referred as VIG) which demonstrates highly improved resistance to thermal stress induced by a temperature difference between interior and exterior environments.

It has been surprisingly found that the vacuum-insulated glazing of the present invention wherein a first glass plane is thicker than a second glass plane (Z1>Z2), by a thickness ratio Z1/Z2 of the thickness of the first glass pane, Z1, to the thickness of the second glass pane, Z2, equal to or greater than 1.30 and wherein the second glass pane made of prestressed glass, provides highly improved resistance to thermal induced stress. The asymmetric VIG configuration provides better thermal stress resistance than the corresponding symmetric vacuum-insulated glazing, both being of the same overall thickness.

The vacuum-insulated glazing the present invention will be hereinafter referred to as the "asymmetric VIG".

The invention relates to a vacuum-insulated glazing panel typically comprising a first glass pane and a second glass pane that are associated together by way of at least one spacer that holds said panes a certain distance apart, typically no more than 2 mm and, between said glass panes, an internal space comprising at least one first cavity, in which cavity there is a vacuum less than 0.1 mbar, said space being closed with a peripherical hermetically bonding seal placed on the periphery of the glass panes around said internal space.

Figure 1:
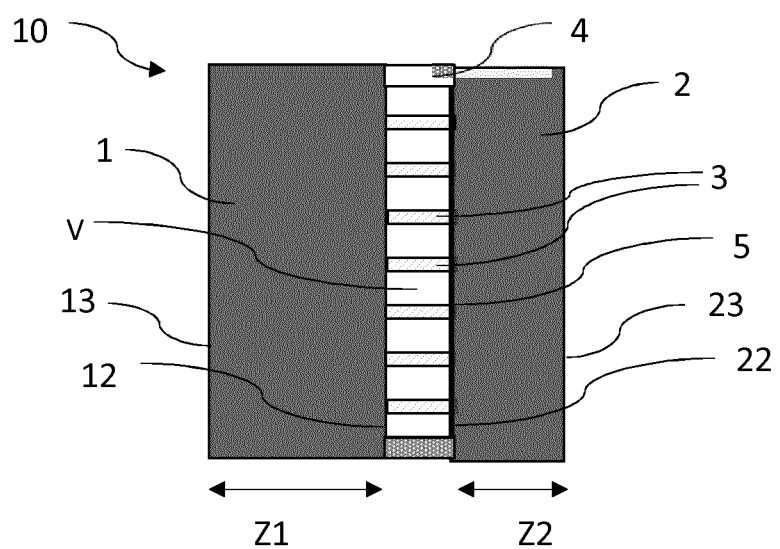
FIG. 1 shows a cross sectional view of a vacuum-insulated glazing according to one embodiment of the present invention.

Accordingly, and as illustrated in FIG. 1, the present invention relates to a vacuum insulating glazing unit (10) extending along a plane, P, defined by a longitudinal axis, X, and a vertical axis, Z, comprising:

a) a first glass pane (1) having a thickness Z1, and a second glass pane (2) having a thickness, Z2, wherein the thicknesses are measured in the direction normal to the plane, P, and wherein Z1 is greater than Z2 (Z1>Z2);

b) a set of discrete spacers (3) positioned between the first and second glass panes and maintaining a distance between the first and the second glass panes;

c) a hermetically bonding seal (4) sealing the distance between the first and second glass panes over a perimeter thereof;

d) an internal volume, V, defined by the first and second glass panes and the set of discrete spacers and closed by the hermetically bonding seal and wherein a vacuum of pressure less than 0.1 mbar is created.

Within the present invention, the thickness ratio, Z1/Z2, of the thickness of the first glass pane, Z1, to the thickness of the second glass pane, Z2, is equal to or greater than 1.30 (Z1/Z2 1.30). In a preferred embodiment, the thickness ratio of the thickness of the first glass pane, Z1, the thickness of the second glass pane, Z2, is equal to or greater than 1.55 (Z1/Z2≥1.55), preferably comprised between 1.60 and 15.00 (1.60≤Z1/Z2≤15.00), preferably between 2.00 and 8.00 (2.00≤Z1/Z2≤8.00) and more preferably between 2.00 and 6.00 (2.00≤Z1/Z2≤6.00).

In a preferred embodiment of the present invention, the thickness of the second glass pane, Z2, is comprised between 1 mm and 8 mm (1 mm 2 mm), preferably between 2 mm and 6 mm (2 mm 2 mm) and more preferably between 3 mm and 6 mm (3 mm 6 mm).

Thermal induced stress occurs as soon as there is a temperature difference between the first glass pane (1, T1) and the second glass panes (2, T2) and increases with increasing differences between T1 and T2. The temperature difference (ΔT) is the absolute difference between the mean temperature T1 calculated for the first glass pane (1) and the mean temperature T2 calculated for the second glass pane (2). The mean temperature of a glass pane is calculated from numerical simulations known by the skilled person on the art.

Thermal induced stress becomes even more problematic—up to breaking the VIG, when such absolute temperature differences between the glass panes reaches 20° C. and even more when the absolute temperature difference is higher than 30° C.

Figure 2:
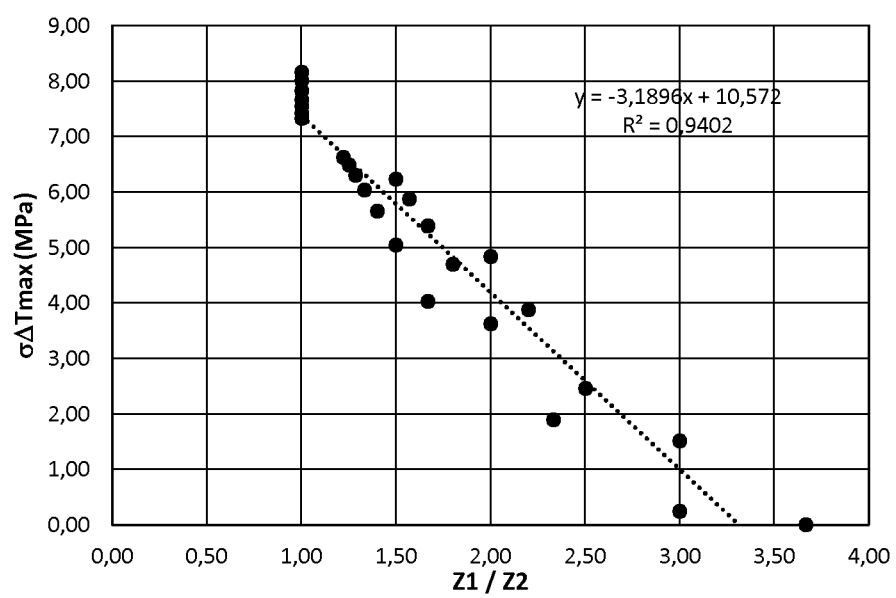
FIG. 2 shows the finite element modelling results of the correlation of the maximum thermal stress ((σΔT Max) calculated on the glass panes at ΔT=35° C. as a function of the Z1/Z2 thickness ratio.

The present invention is based on the surprising finding that a reduced thermal induced stress can be achieved via an asymmetric VIG configuration wherein the ratio Z1/Z2 of the thicker glass pane, Z1, to the thinner glass pane, Z2, should be equal or greater than 1.3. It has been found this asymmetry property allows to reduce the thermal stress. It has been further found that the higher the thickness ratio is, the greater is the thermal induced stress reduction. FIG. 2 shows the finite element modelling results of the correlation of the maximum thermal stress (σΔT Max) calculated on the glass panes at ΔT=35° C. as a function of the Z1/Z2 thickness ratio.

Thermal induced stress (σΔT) is the stress induced on the glass panes of the VIG by the temperature difference between the first and second spaces. Numerical simulation is used to calculate thermal stress on each glass panes of the VIG. A finite element analysis (FEA) model by Abaqus FEA (formerly referred to by ABAQUS) has been built to stimulate the behavior of a vacuum-insulated glazing when exposed at different temperature conditions. The thermal stress induced by the temperature difference has been calculated on each glass pane and is expressed in MPa. The induced thermal stress has been calculated for VIGs comprising glass panes of different thicknesses in an asymmetric configuration (as in the present invention) and compared to its corresponding symmetric configuration, wherein the overall thickness of the VIG has been maintained. For example, the induced thermal stresses of a VIG of overall thickness of 12 mm, comprising first and second glass panes, each presenting a thickness of 6 mm (prior art), have been compared to the induced thermal stress of different asymmetric configurations (within the present invention) wherein the thicknesses of the first and second glass panes are as follows e.g.; 7 mm-5 mm/8 mm-4 mm/9 mm-3 mm.

In FIG. 2, the maximum induced thermal stress value is the highest value obtained for the first and second glass panes. The thermal stress is calculated at the following conditions:

Temperature: ΔT=35° C. ΔT is calculated as the temperature difference between the mean temperature of the first glass pane, T1, and the mean temperature of the second glass pane, T2;

Glass planes are made of soda-lime silica glass and of size 1 m×1 m,

VIG with a thermal transmittance, U=0.7 W/m²K;

The experimental VIG is with unconstraint edges, i.e. not positioned within an additional window frame;

The interval between the spacers (also referred to as pitch) is of 20 mm.

It has been found however that while this asymmetry is excellent for reducing thermal induced stress, it will negatively impact the performance of the asymmetric VIG in term of resistance to the stress induced by the atmospheric pressure at the pillars locations. This deterioration is caused mainly by the fact that the second glass pane of the asymmetric VIG is thinner than the glass panes within the corresponding symmetric VIG which has the same total thickness.

The atmospheric pressure causes permanent tensile stresses at the external surfaces of the glass panes of the VIG. This tensile stress can be calculated by the following formula: $\sigma = 0.11 \times \lambda^2/t^2$ [MPa] wherein λ. [m] and t [m] are respectively, the pitch between the spacers and the glass panes thickness. By pitch, it means the interval between the spacers.

The tensile stress of 2 vacuum-insulated glazing of the same size, comprising the same spacers positioned between the glass panes at the same pitch, and being of the same overall thickness, have been calculated for different embodiments: one configuration is a symmetric VIG wherein the first and second glass panes are of the same thickness and the second configuration is an asymmetric VIG wherein the thickness of the first glass pane, Z1, is thicker than the thickness of the second glass pane, Z2, with a thickness ratio Z1/Z2 greater than 1.30.

TABLE 1

|  |  | Symmetric first glass pane | Symmetric second glass pane | Asymmetric first glass pane | Asymmetric second glass pane |
|---|---|---|---|---|---|
| Ex. 1 | Thickness (mm) | 6 | 6 | 8 | 4 |
|  | Ratio Z1/Z2 | 1 |  | 2 |  |
|  |  | annealed | annealed | annealed | Thermally toughened |
| A | Atmospheric pressure induced stress $\sigma = 0.11 \times \lambda^2/t^2$ [MPa] For $\lambda = 45$ mm | 6.19 | 6.19 | 3.48 | 13.92 |
| Ex. 2 | Thickness (mm) | 8 | 8 | 12 | 4 |
|  | Ratio Z1/Z2 | 1 |  | 3 |  |
|  |  | annealed | annealed | annealed | Thermally toughened |
| B | Atmospheric pressure induced stress $\sigma = 0.11 \times \lambda^2/t^2$ [MPa] For $\lambda = 45$ mm | 3.48 | 3.48 | 1.55 | 13.92 |

It has been found that configuring an asymmetric VIG with a thickness ratio of the first glass pane, Z1, to the thickness of the second glass pane, Z2, equal or greater than 1.30 and therefore reducing the thickness of the second pane, is excellent in significantly reducing the thermally induced stress (FIG. 2) but is highly detrimental to the atmospheric pressure induced stress which increases significantly at the surface of the second pane, as per examples 1 and 2 in Table 1, Lines A and B.

The acceptable atmospheric pressure induced stress is to be calculated for each VIG and will depends on the specific location and thereby the specific atmospheric conditions in which the VIG is placed. For example, reference can be made to the latest draft of the European norm PrEN16612 "Glass in building—Determination of the lateral load resistance of glass panes by calculation", which allows to calculate the design value of bending strength fg; d). The design value defines the highest value of stress to not to be exceeded for a predetermined load such as the atmospheric pressure. For unsupported edges, annealed and float glass, the acceptance design value for the atmospheric pressure induced stress is 7.25 MPa ($f_{g\ d}$=7.25 MPa).

As calculated in Table 1, for the two symmetric VIGs having similar panes thicknesses of respectively 6 mm and 8 mm, the atmospheric pressure induced stresses calculated at the pillars location are 6.19 MPa and 3.48 MPa, respectively. Those calculated values are lower than the acceptance design value of 7.25 MPa. However, for two asymmetric VIG configurations, the atmospheric pressure induced stresses at the pillars location of the second thin glass panes (4 mm) is higher than the acceptance design value of 7.25 MPa.

One solution to address such issue of the atmospheric pressure induced stress increase is to increase the thickness of the second pane. However, increasing the thickness of the second glass panes within the asymmetric of the present invention means decreasing the thickness ratio and thereby reduced its positive impact on reduced thermal induced stress. Moreover, increasing the thickness of the second glass has a further negative impact on the overall weight of the VIG.

Figure 3:
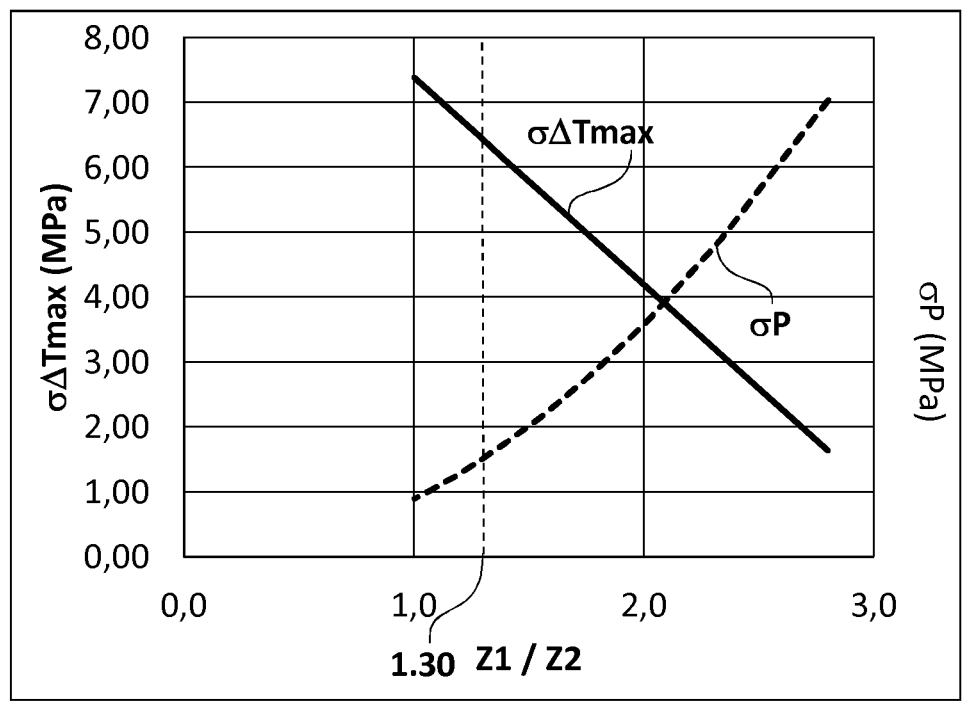
FIG. 3 shows the correlation of the extrapolated maximum thermal stress ((σΔT Max), calculated on the glass panes at ΔT=35° C. and the values of the atmospheric pressure induced stress at the pillars locations, σp calculated with a spacer pitch of 20 mm, both as a function of Z1/Z2 thickness ratio.

FIG. 3 further illustrates this technical challenge by showing the correlation of the extrapolated maximum thermal stress ($\sigma\Delta T$ Max), calculated on the glass panes at $\Delta T=35°$ C. and the values of the pressure induced stress, op calculated with a spacer pitch of 20 mm and the thickness of the first pane at 7 mm (Z1=7 mm), both as a function of Z1/Z2 thickness ratio.

It has been surprisingly found that this technical challenge can be solved by using a prestressed glass, for the second glass pane, to increase its bending strength. By prestressed glass, it means a heat strengthened glass, a thermally toughened safety glass, or a chemically strengthened glass. The use of prestressed glass allows to stand the increased induced atmospheric pressure stress on the second glass while maintaining the thickness ratio Z1/Z2. The asymmetric VIG of the present invention gives a technical solution allowing the reduction of the stress induced by the temperature difference between the first and the second glass panes and the improvement of the resistance to the atmospheric pressure stress, by increasing the thickness ration Z1/Z2, and by using prestressed glass for the second glass pane.

Indeed, referring to the same European norm PrEN16612, the acceptance design value calculated for the same glass in the same conditions but with a thermally toughened glass, increases to 69.75 MPa ($f_{g\ d}$=69.75 MPa). Using prestressed glass for the second pane of the asymmetric VIG of the present invention allows therefore to make most of the technical advantages of brought by the asymmetry of the VIG of the present invention.

In a preferred embodiment of the present invention, the thickness of the first glass pane, Z1, is equal to or greater to 3 mm, (Z1 3 mm), preferably is equal to or greater to 4 mm, (Z1 4 mm), more preferably equal to or greater to 5 mm, (Z1 5 mm), even more preferably equal to or greater to 6 mm, (Z1 6 mm). It has been further found indeed that the higher the thickness ratio (Z1/Z2) is, the better it is for thermal induced stress reduction. Therefore, it is preferred that the first pane has a significant thickness, Z1, to provide more flexibility in increasing the thickness ratio between the first and second glass panes and thereby to provide improved resistance to thermal induced stress.

Furthermore, in addition to the improvement of the mechanical performances, the asymmetric VIG of the present invention wherein the thickness ratio Z1/Z2 is equal to or greater than 1.30, and wherein the second glass pane is made of prestressed glass allows to further improve the thermal insulation of the asymmetric VIG of the present invention, as shown in Table 2.

TABLE 2

|  |  | Symmetric first glass pane | Symmetric second glass pane | Asymmetric first glass pane | Asymmetric second glass pane |
|---|---|---|---|---|---|
| Ex. 3 | Thickness (mm) | 6 | 6 | 8 | 4 |
|  | Ratio Z1/Z2 | 1 |  | 2 |  |
|  |  | annealed | annealed | annealed | Thermally toughened |
| A | Atmospheric pressure induced stress $\sigma = 0.11 \times \lambda^2/t^2$ [MPa] For $\lambda = 45$ mm | 6.19 | 6.19 | 3.48 | 13.92 |
| B | Atmospheric pressure induced stress $\sigma = 0.11 \times \lambda^2/t^2$ [MPa] For $\lambda = 60$ mm | 11.00 | 11.00 | 6.19 | 24.75 |

As indicated in Table 2, while maintaining for example the atmospheric pressure induced stress at the first glass pane to the level obtained in the corresponding symmetric VIG, being under the acceptance design value, the asymmetric VIG of the present invention allows to increase the pitch of the spacers positioned between the first and second glass panes therefore reducing the number of pillars. In contrast, the atmospheric pressure induced stress on the glass panes of the symmetric VIG has increased above the acceptance design value. As indicated above, the prestressed glass pane (2) can stand this increased atmospheric pressure induced stress.

By reducing the number of pillars, the heat conduction transfer will decrease and the thermal transmittance of the VIG (U-value) will be improved, leading to a lower U value and thereby better heat insulating properties.

The asymmetric VIG of the present invention is typically used to close an opening within a partition such as in general-purpose glazing units, a build wall, automotive glazing units or architectural glazing units, appliances. This partition separates a first space characterized by a first temperature, Temp1 from a second space defined by a second temperature, Temp2, wherein the Temp1 is lower than Temp2. The temperature of the interior space is typically from 15 to 25° C. whereas the temperature of the exterior space can extend from −20° C. the winter to +40° C. in the summer. Therefore, the temperature difference between the interior space and the exterior space can typically reach up 35° C. The temperature of each glass panes of the asymmetric VIG of the present invention, (T1, T2) will reflect the temperature of the corresponding space (Temp1, Temp2). If the asymmetric VIG of the present invention is positioned so that its first glass pane is facing the first space, the temperature of said first glass pane (T1) will reflect the temperature of the first space (Temp1) and the temperature of the second glass pane (T2) will reflect the temperature of the second space (Temp2) and vice-versa.

In a preferred embodiment, the asymmetric VIG of the present invention will close an opening of a partition separating a first space with a first temperature, Temp1, from a second space with a second temperature, Temp2, wherein Temp1 is lower than Temp1. The first glass pane of the asymmetric of the VIG is facing the first space so that the first pane (1) with a thickness, Z1, greater than the thickness of the second pane (2), Z2, is facing the first space having a lower temperature (Temp1) than the temperature of the second space (Temp2). Indeed, it had been found that to maximize the technical advantages of the asymmetric VG of the present invention, it is preferred to expose the first glass pane (1) with a thickness Z1 greater than the thickness of the second glass pane, Z2; to the "cold side", i.e., to the space having the lowest temperature (Temp1).

The present invention also relates to the use of an asymmetric vacuum insulated glazing unit as defined above, to close the opening of a partition separating a first space with a first temperature, Tempt, from a second space with a second temperature, Temp2, wherein Temp1 is lower than Temp2, and wherein the first glass pane is facing the first space.

The second glass pane of the asymmetric VIG of the present invention is a prestressed glass. By prestressed glass, it is meant herein a heat strengthened glass, a thermally toughened safety glass, or a chemically strengthened glass.

Heat strengthened glass is heat treated using a method of controlled heating and cooling which places the outer glass surfaces under compression and the inner glass surface under tension. This heat treatment method delivers a glass with a bending strength greater than annealed glass but less than thermally toughened safety glass.

Thermally toughened safety glass is heat treated using a method of controlled heating and cooling which puts the outer glass surface under compression and the inner glass surface under tension. Such stresses cause the glass, when impacted, to break into small granular particles instead of splintering into jagged shards. The granular particles are less likely to injure occupants or damage objects.

The chemical strengthening of a glass article is a heat induced ion-exchange, involving replacement of smaller alkali sodium ions in the surface layer of glass by larger ions, for example alkali potassium ions. Increased surface compression stress occurs in the glass as the larger ions "wedge" into the small sites formerly occupied by the sodium ions. Such a chemical treatment is generally carried out by immerging the glass in an ion-exchange molten bath containing one or more molten salt(s) of the larger ions, with a precise control of temperature and time. Aluminosilicate-type glass compositions, such as for example those from the products range DragonTrail® from Asahi Glass Co. or those from the products range Gorilla® from Corning Inc., are also known to be very efficient for chemical tempering.

In one embodiment of the present invention, the first glass pane can be as well a prestressed glass.

The first and second pane of the vacuum-insulated glazing (VIG) according to the invention are glass panes (1, 2). The glass panes can be chosen among all flat glass technologies, among them: float clear, extra-clear or colored glass. The term "glass" is herein understood to mean any type of glass or equivalent transparent material, such as a mineral glass or an organic glass. The mineral glasses used may be irrespectively one or more known types of glass such as soda-limesilica, aluminosilicate or borosilicate, crystalline and polycrystalline glasses. The organic glass used may be a polymer or a rigid thermoplastic or thermosetting transparent polymer or copolymer such as, for example, a transparent synthetic polycarbonate, polyester or polyvinyl resin. The glass pane can be obtained by a floating process, a drawing process, a rolling process or any other process known to manufacture a glass pane starting from a molten glass composition. The glass panes can optionally be edge-ground. Edge grinding renders sharp edges into smooth edges which are much safer for people who could come in contact with the vacuum-insulating glazing, in particular with the edge of the glazing. Preferably and for reasons of lower production costs, the glass pane according to the invention is a pane of soda-lime-silica glass, aluminosilicate glass or borosilicate glass type.

Preferably, the composition for the first and second glass panes of the asymmetric VIG of the invention comprises the following in weight percentage, expressed with respect to the total weight of glass:

| | |
|---|---|
| SiO2 | 40-78% |
| Al2O3 | 0-18% |
| B2O3 | 0-18% |
| Na2O | 0-20% |
| CaO | 0-15% |
| MgO | 0-10% |
| K2O | 0-10% |
| BaO | 0-5%. |

More preferably, the glass composition is a soda-lime-silicate-type glass with a base glass matrix of the composition comprising the following in weight percentage, expressed with respect to the total weight of glass:

| | |
|---|---|
| SiO2 | 60-78 wt % |
| Al2O3 | 0-8 wt %, pref 0-6 wt % |
| B2O3 | 0-4 wt %, pref 0-1 wt % |
| CaO | 0-15 wt %, pref 5-15 wt % |
| MgO | 0-10 wt %, pref 0-8 wt % |
| Na2O | 5-20 wt %, pref 10-20 wt % |
| K2O | 0-10 wt % |
| BaO | 0-5 wt %, pref 0-1 wt %. |

Another preferred glass composition for the first and second glass panes of the asymmetric VIG of the invention, comprises the following in weight percentage, expressed with respect to the total weight of glass:
65≤SiO2≤78 wt %
5≤Na2O≤20 wt %
0≤K2O<5 wt %
1≤Al2O3<6 wt %, pref 3<Al2O3≤5%
0≤CaO<4.5 wt %
4≤MgO≤12 wt %
(MGO/(MgO+CaO))≥0.5, pref 0.88≤[MgO/(MgO+CaO)]<1.

Another preferred glass composition for the first and second glass panes of the asymmetric VIG of the invention, comprises the following in weight percentage, expressed with respect to the total weight of glass:
60≤SiO2≤78%
5≤Na2O≤20%
0.9<K2O≤12%
4.9≤Al2O3≤8%
0.4<CaO<2%
4<MgO≤12%

Another preferred glass composition for the first and second glass panes of the asymmetric VIG of the invention, comprises the following in weight percentage, expressed with respect to the total weight of glass:
65≤SiO2≤78 wt %
5≤Na2O≤20 wt %
1≤K2O<8 wt %
1≤Al2O3<6 wt %
2≤CaO<10 wt %
0≤MgO≤8 wt %
K2O/(K2O+Na2O): 0.1-0.7.

In particular, examples of base glass matrixes for the composition according to the invention are described published in PCT patent applications WO2015/150,207A1 and WO2015/150,403A1, in filed PCT patent applications WO2016/091,672 A1 and WO2016/169,823A1 and WO2018/001,965 A1.

In a preferred embodiment of the present invention, in order to provide a glass composition which is easy chemically temperable, i.e. more favourable to ion exchange than conventional soda-lime-silica glass compositions, the second glass pane is a thermally toughened or a chemically strengthened soda-lime-silica glass type; preferably comprises the following in weight percentage, expressed with respect to the total weight of glass:

| | |
|---|---|
| SiO2 | 60-78% |
| Al2O3 | 0-8% |
| B2O3 | 0-4% |
| Na2O | 5-20%, pref 10-20 wt % |
| CaO | 0-15% |
| MgO | 0-12% |
| K2O | 0-10% |
| BaO | 0-5%. |

The first and second glass panes of the vacuum-insulated glazing of the present invention can be of the same or of a different type, while the second glass pane will necessarily be a prestressed glass. The glass planes can be of the same dimensions or of different dimensions and form thereby a stepped VIG. In a preferred embodiment of the present invention, the first and the second glass panes comprises first and second peripheral edges, respectively and wherein the first peripheral edges are recessed from the second peripheral edges or wherein the second peripheral edges are recessed from the first peripheral edges. This configuration allows to reinforce the strength of the hermetically bonding seal.

In a preferred embodiment, at least one of the first and/or second glass pane, preferably the second pane can be a laminated glass pane. Laminated glass is a type of safety glass that holds together when shattered. In the event of breaking, it is held in place by a thermoplastic interlayer between its two or more layers of glass. The interlayer keeps the layers of glass bonded even when broken, and its high strength prevents the glass from breaking up into large sharp pieces. The thermoplastic interlayer to be used between the different laminated layers can be a material selected from the group consisting of ethylene vinyl acetate (EVA), polyisobutylene (PIB), polyvinyl butyral (PVB), polyurethane (PU), Cyclo Olefin Polymers (COP), an ultraviolet activated adhesive, and/or other transparent or translucent bonding material. Preferably the thermoplastic interlayer is an ethylene vinyl acetate layer.

In another preferred embodiment, the present invention also applies to any type of glazing panel comprising glass panes (two, three or more) bounding insulating or noninsulating internal spaces (also called multiple glazing panels) provided that a partial vacuum is generated in at least one of these internal spaces.

In another preferred embodiment, the asymmetric VIG of the present invention additionally comprises a third glass pane separated from one of the first and second glass panes by a second space forming a second cavity and a second seal positioned on the periphery of the third glass pane and one of the first and second glass panes in order to maintain the second space, wherein said second cavity is filled with at least one gas such for example, but not exclusively, dry air, argon (Ar), krypton (Kr), xenon (Xe), sulfur hexafluoride (SF6) or even a mixture of certain of these gases.

In another embodiment, at least one of the first and/or second glass pane of the asymmetric VIG of the present invention can be replaced by a typical insulating glass unit (IGU) comprising: at least a first and a second glass plates separated by a spacer coupled along a periphery of the insulated glass unit to the first and second glass plates creating an insulating cavity, and further comprising a cordon of sealant securing the first and second glass plates together and sealing the insulating cavity.

Other options, such as heat insulation with low-emissivity (Low E) coatings, solar control coatings, anti-reflective coating provided on at least one of the surface of the first and/or second glass panes, reinforced acoustic insulation with acoustic laminated glass are also compatible with the present concept to improve the performances of the window or door. Glass planes with electrochromic, thermochromic, photochromic or photovoltaic elements are also compatible with the present invention.

In another preferred embodiment of the present invention, at least one of the inner pane faces (12, 21) and/or outer pane faces (13,23) of the first and/or second glass panes (1, 2) of the vacuum-insulated glazing (10), are provided with a heat ray reflection film or a low-E film (5). The embodiment illustrated in FIG. 1 shows a heat ray reflection film or a low-E film provided on the inner face of the second glass pane.

As depicted in FIG. 1, the vacuum-insulated glazing of the present invention comprises a plurality of spacers (3) sandwiched between the first and second glass panes (1, 2) so as to maintain the internal volume, V.

The spacers can have different shapes, such as cylindrical, spherical, filiform, hour-glass shaped, cruciform, prismatic shape; the term "pillars" can also be used.

The spacers are typically made of a material having a strength endurable against pressure applied from the surfaces of the glass panes, capable of withstanding high-temperature process such as burning and baking, and hardly emitting gas after the glass panel is manufactured. Such a material is preferably a hard metal material, quartz glass or a ceramic material, in particular, a metal material such as iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, duralumin or the like, or a ceramic material such as corundum, alumina, mullite, magnesia, yttria, aluminum nitride, silicon nitride or the like.

The spacers are typically placed between the first and second glass panes so as to form a grid the pitch of which is comprised 15 and 100 mm, preferably between 20 mm and 80 mm, more preferably between 20 mm and 60 mm. By spacer pitch, it is meant the interval between the spacers.

As shown in FIG. 1, the internal volume, V, between the glass panes (1, 2) of the vacuum-insulated glazing (10) of the present invention is closed with a hermetically bonding seal (4) placed on the periphery of the glass panes around said internal space. The said hermetically bonding seal is impermeable and hard. Such as used here and unless otherwise indicated, the term "impermeable" is understood to mean impermeable to air or any other gas present in the atmosphere.

Temperature gradient between interior and exterior spaces cause indeed different thermal deformation of the first and second glass panes of the present invention. The constrains on each glass planes are even more critical when the sealing placed on the periphery of the glass panes are hard. A contrario, such constraints will be lower within VIGs wherein the peripheral seal allows for some deformation.

Various hermetically bonding seal technologies exist. A first type of seal (the most widespread) is a seal based on a solder glass for which the melting point is lower than that of the glass of the glass panels of the glazing unit. The use of this type of seal limits the choice of low-E layers to those that are not degraded by the thermal cycle required to implement the solder glass, i.e. to those that are able to withstand a temperature possibly as high as 250° C. In addition, since this type of solder-glass-based seal is only very slightly deformable, it does not allow the effects of differential expansion between the interior-side glass panel of the glazing unit and the exterior-side glass panel of the glazing unit when said panels are subjected to large temperature differences (for example 20° C.) to be absorbed. Quite substantial stresses are therefore generated at the periphery of the glazing unit and may lead to breakage of the glass panels of the glazing unit.

A second type of seal comprises a metal seal, for example a metal strip of a small thickness (<500 µm) soldered to the periphery of the glazing unit by way of a tie underlayer covered at least partially with a layer of a solderable material such as a soft tin-alloy solder. One substantial advantage of this second type of seal relative to the first type of seal is that it is able to partially deform in order to partially absorb the differential expansion created between the two glass panels. There are various types of tie underlayers on the glass panel.

Patent application WO 2011/061,208 A1 describes one example embodiment of a peripheral impermeable seal of the second type for a vacuum-insulated glazing unit. In this embodiment, the seal is a metal strip, for example made of copper, that is soldered by means of a solderable material to an adhesion band provided on the periphery of the glass panes.

A vacuum of pressure less than 0.1 mbar, preferably less than 0.01 mbar is created, within the internal volume, V, defined by the first and second glass panes and the set of spacers and closed by the hermetically bonding seal within the asymmetric VIG of the present invention.

The internal volume of the asymmetric VIG of the present invention, can comprise a gas, for example, but not exclusively, dry air, argon (Ar), krypton (Kr), xenon (Xe), sulfur hexafluoride (SF 6) or even a mixture of certain of these gases. The transfer of energy through an insulating panel having this conventional structure is decreased, because of the presence of the gas in the internal volume, relative to a single glass pane.

The internal volume may also be pumped of any gas, creating therefore a vacuum glazing unit. Energy transfer through a vacuum-insulated insulating glazing panel is greatly decreased by the vacuum. To generate the vacuum in the internal space of the glazing panel, a hollow glass tube bringing the internal space into communication with the exterior is generally provided on the main face of one of the glass pane s. Thus, the partial vacuum is generated in the internal space by pumping out gases present in the internal space by virtue of a pump connected to the exterior end of the glass tube.

To maintain for the duration a given vacuum level in a vacuum-insulated glazing panel, a getter may be used in the glazing panel. Specifically, the internal surfaces of the glass panes making up the glazing panel may release over time gases absorbed beforehand in the glass, thereby increasing the internal pressure in the vacuum-insulated glazing panel and thus decreasing the vacuum performance. Generally, such a getter consists of alloys of zirconium, vanadium, iron, cobalt, aluminum, etc., and is deposited in the form of a thin layer (a few microns in thickness) or in the form of a block placed between the glass panes of the glazing panel so as not to be seen (for example hidden by an exterior enamel or by a portion of the peripheral impermeable seal). The getter forms, on its surface, a passivation layer at room temperature, and must therefore be heated in order to make the passivation layer disappear and thus activate its alloy gettering properties. The getter is said to be "heat activated".

| Ref.# | Feature |
|---|---|
| 10 | Vacuum-insulated glazing |
| 1 | First glass pane |
| 12 | First inner pane face |
| 13 | First outer pane face |
| 2 | Second glass pane |
| 22 | Second inner pane face |
| 23 | Second outer pane face |
| 3 | Spacer |
| 4 | Hermetically bonding seal |
| 5 | Heat ray reflection film or Low E film |
| V | Internal volume |

The invention claimed is:

1. A vacuum insulating glazing unit extending along a plane, P, defined by a longitudinal axis, X, and a vertical axis, Z, comprising:
   a. a first glass pane having a thickness Z1, and a second glass pane having a thickness, Z2, wherein the thicknesses are measured in a direction normal to the plane, P, and wherein Z1 is greater than Z2 (Z1>Z2);
   b. a set of discrete spacers positioned between the first and second glass panes and maintaining a distance between the first and the second glass panes;
   c. a hermetically bonding seal sealing the distance between the first and second glass panes over a perimeter thereof; and
   d. an internal volume, V, defined by the first and second glass panes and the set of discrete spacers and closed by the hermetically bonding seal and wherein a vacuum of pressure less than 0.1 mbar is created,
   wherein a thickness ratio, Z1/Z2, of the thickness of the first glass pane, Z1, to the thickness of the second glass pane, Z2, is equal to or greater than 1.30 (Z1/Z2≥1.30), and
   wherein the second glass pane is made of prestressed glass.

2. A vacuum insulating glazing unit according to claim 1, wherein the thickness ratio, Z1/Z2, is equal to or greater than 1.55 (Z1/Z2≥1.55).

3. A vacuum insulating glazing unit according to claim 1, wherein the thickness of the first glass pane, Z1 is equal to or greater than 3 mm, (Z1≥3 mm).

4. A vacuum insulating glazing unit according to claim 1, wherein the thickness of the second glass pane, Z2, is between 1 mm and 8 mm (1 mm≤Z2≤8 mm).

5. A vacuum insulating glazing unit according to claim 1, wherein the set of spacers forms a grid having a pitch comprised between 15 and 100 mm.

6. A vacuum insulating glazing unit according to claim 1, wherein at least one of the first and/or second glass panes is made from soda-lime-silica glass, aluminosilicate glass or borosilicate glass type.

7. A vacuum insulating glazing unit according to claim 1, wherein the second glass pane is a thermally toughened or a chemically strengthened soda-lime-silica glass type.

8. A vacuum insulating glazing unit according to claim 6, wherein a composition of the second glass pane comprises the following in weight percentage, expressed with respect to the total weight of glass:

| | |
|---|---|
| $SiO_2$ | 60-78% |
| $Al_2O_3$ | 0-8 wt %, |
| $B_2O_3$ | 0-4 wt %, |
| $Na_2O$ | 5-20 wt %, |
| CaO | 0-15 wt %, |
| MgO | 0-12 wt %, |
| $K_2O$ | 0-10%, and |
| BaO | 0-5%. |

9. A vacuum insulating glazing unit according to claim 1, wherein at least one of the first and/or second glass pane is a laminated glass pane.

10. A vacuum insulating glazing unit according to claim 1, wherein the first and second glass panes comprise a first inner plate face and a second inner plate face, respectively, and a first outer plate face and a second outer plate face, respectively, and wherein at least one of the first and/or second inner faces and/or outer faces is provided with at least a heat ray reflection film or a low-E film.

11. A vacuum insulating glazing unit according to claim 1, wherein at least one of the first and/or second glass panes consists of an insulating glass unit comprising: at least a first glass plate and a second glass plate separated by a spacer coupled along a periphery of the insulated glass unit to the first and second glass plates creating an insulating cavity, and further comprising a cordon of sealant securing the first and second glass plates together and sealing the insulating cavity.

12. A vacuum insulating glazing unit according to 1, wherein the first and the second glass panes comprise first and second peripheral edges, respectively, and wherein the first peripheral edges are recessed from the second peripheral edges or wherein the second peripheral edges are recessed from the first peripheral edges.

13. A vacuum insulating glazing unit according to claim 1, wherein a pressure in the internal volume is less than 0.01 mBar.

14. A partition separating a first space with a first temperature, Temp1, from a second space with a second temperature, Temp2, wherein Temp1 is lower than Temp2; said partition comprising an opening being closed by a vacuum insulating glazing unit according to claim 1, wherein the first glass pane is facing the first space.

15. A vacuum insulating glazing unit according to claim 1, wherein the thickness ratio, Z1/Z2, is between 1.60 and 15.00 (1.60≤Z1/Z2≤15.00).

16. A vacuum insulating glazing unit according to claim 1, wherein the thickness ratio, Z1/Z2, is between 2.00 and 8.00 (2.00≤Z1/Z2≤8.00).

17. A vacuum insulating glazing unit according to claim 1, wherein the thickness ratio, $Z1/Z2$, is between 2.00 and 6.00 ($2.00 \leq Z1/Z2 \leq 6.00$).

18. A vacuum insulating glazing unit according to claim 1, wherein the thickness of the first glass pane, $Z1$, is equal to or greater to 4 mm ($Z1 \geq 4$ mm).

19. A vacuum insulating glazing unit according to claim 1, wherein the thickness of the second glass pane, $Z2$, is between 2 mm and 6 mm ($2$ mm $\leq Z2 \leq 6$ mm).

20. A glazing unit comprising:
a vacuum insulated glazing unit extending along a plane, P, defined by a longitudinal axis, X, and a vertical axis, Z, the vacuum insulated glazing unit further comprising,
　a. a first glass pane having a thickness $Z1$, a second glass pane having a thickness, $Z2$, wherein the thicknesses are measured in a direction normal to the plane, P, and wherein $Z1$ is greater than $Z2$ ($Z1 > Z2$);
　b. a set of discrete spacers positioned between the first and second glass panes and maintaining a distance between the first and the second glass panes;
　c. a hermetically bonding seal sealing the distance between the first and second glass panes over a perimeter thereof; and
　d. an internal volume, V, defined by the first and second glass panes and the set of discrete spacers and closed by the hermetically bonding seal and wherein a vacuum of pressure less than 0.1 mbar is created, and
a third glass pane,
wherein a thickness ratio, $Z1/Z2$, of the thickness of the first glass pane, $Z1$, to the thickness of the second glass pane, $Z2$, is equal to or greater than 1.30 ($Z1/Z2 \geq 1.30$),
wherein the second glass pane is made of pre-stressed glass, and
wherein the third glass pane is joined to either the first or second glass pane by a seal positioned on a periphery of the third glass pane.

21. A glazing unit according to claim 20, wherein a cavity is defined by the third glass pane, the peripheral seal positioned on the third glass pane, and the joined first or second glass pane, and
wherein the cavity is filled with at least one gas.

* * * * *